United States Patent [19]
Shah

[11] Patent Number: 5,887,250
[45] Date of Patent: Mar. 23, 1999

[54] MOBILE STATION HAVING LOCK CODE BASED ON SECURE VALUE

[75] Inventor: Bharat Shah, San Diego, Calif.

[73] Assignee: Nokia Mobile Phones Limited, Salo, Finland

[21] Appl. No.: 678,569

[22] Filed: Jul. 12, 1996

[51] Int. Cl.⁶ .................................................. H04Q 7/20
[52] U.S. Cl. ........................... 455/411; 380/23; 380/21; 380/46; 455/419
[58] Field of Search ............... 380/23; 455/410, 455/411, 418, 419, 585, 551

[56] References Cited

U.S. PATENT DOCUMENTS

| | | | |
|---|---|---|---|
| 4,868,846 | 9/1989 | Kemppi | 379/144 |
| 5,091,942 | 2/1992 | Dent | 380/46 |
| 5,237,612 | 8/1993 | Raith | 380/23 |
| 5,241,598 | 8/1993 | Raith | 380/21 |
| 5,266,782 | 11/1993 | Alanara et al. | 235/380 |
| 5,282,250 | 1/1994 | Dent et al. | 380/23 |
| 5,315,638 | 5/1994 | Mukari | 379/58 |
| 5,335,278 | 8/1994 | Matchett et al. | 380/23 |
| 5,353,328 | 10/1994 | Jokimies | 379/58 |
| 5,420,910 | 5/1995 | Rudokas et al. | 379/59 |
| 5,444,764 | 8/1995 | Galecki | 379/58 |
| 5,448,622 | 9/1995 | Huttunen | 379/58 |
| 5,467,382 | 11/1995 | Schorman | 379/58 |
| 5,487,084 | 1/1996 | Lindholm | 375/215 |
| 5,488,649 | 1/1996 | Schellinger | 455/411 |
| 5,497,411 | 3/1996 | Pellerin | 379/59 |
| 5,513,245 | 4/1996 | Mizikovsky et al. | 455/411 |
| 5,537,474 | 7/1996 | Brown et al. | 380/23 |
| 5,551,073 | 8/1996 | Sammarco | 455/411 |
| 5,600,708 | 2/1997 | Meche et al. | 379/59 |
| 5,642,401 | 6/1997 | Yahagi | 455/411 |

Primary Examiner—Wellington Chin
Assistant Examiner—Dablo Tran
Attorney, Agent, or Firm—Perman & Green, LLP

[57] ABSTRACT

A method is disclosed for operating a mobile station (10) that includes the steps of (a) storing in the mobile station a SPC derived at least in part from a multi-bit secret pattern that is stored in the mobile station for use in a mobile station authentication process; (b) entering a SPC into the mobile station; (c) comparing in the mobile station the entered SPC to the stored SPC; and (d) only if the entered SPC and the stored SPC are found to be equal, enabling a desired function to be performed. The multi-bit secret pattern is preferably an A-key, and the SPC is preferably a checksum derived from an algorithmic combination of the A-key and an electronic serial number of the mobile station. The SPC may also be derived from at least one further mobile station parameter, such as the mobile station identification number (MIN) or the international mobile station identity (IMSI). This invention also teaches a method for internally generating the SPC within the mobile station in response to a message received from a base station (30).

20 Claims, 4 Drawing Sheets

MOBILE STATION HAVING LOCK CODE BASED ON SECURE VALUE

FIELD OF THE INVENTION

This invention relates generally to radiotelephones and, in particular, to radiotelephones or mobile stations such as those capable of operation with, by example, a cellular network or a personal communication system (PCS) network.

BACKGROUND OF THE INVENTION

Modern cellular telephones or mobile stations employ or are proposed to employ a lock code or service programming code (SPC) to enable or activate certain features or to enable service to the mobile station from a certain carrier or service provider. By example, if a certain service provider were to provide a mobile station to a user as an incentive to subscribe to the service provider's network, then the service provider would wish to prevent the user from obtaining service with a competing service provider.

The SPC should fulfil at least the following requirements. First, it should be determinable in accordance with some type of algorithm. Second, the SPC of each mobile station should be unique. Third, the carrier must know the unique SPC of each mobile station. Fourth, the security of SPC should be maintained so as to prevent unauthorized persons from learning the SPC. Fifth, the data management requirements of the service provider should be minimal with regards to the SPC.

OBJECTS OF THE INVENTION

It is a first object of this invention to provide an improved method for providing a SPC that fulfills the foregoing and other requirements.

It is a further object of this invention to provide a mobile station that stores a SPC derived from a parameter that is required to be stored in the mobile station.

It is another object of this invention to provide a mobile station that stores a SPC formed from a checksum of a multi-bit secret pattern that is stored in the mobile station for use in a mobile station authentication process.

It is a still further object of this invention to provide a mobile station that internally generates the SPC in response to a command received from a network, the internally generated SPC being derived from at least previously stored values of authentication-related and mobile station identification-related data.

SUMMARY OF THE INVENTION

The foregoing and other objects of the invention are realized by methods and apparatus in accordance with embodiments of this invention. A method of this invention is disclosed for operating a mobile station that includes the steps of (a) storing in the mobile station a SPC derived at least in part from a multi-bit secret pattern that is stored in the mobile station for use in a mobile station authentication process; (b) entering a SPC into the mobile station; (c) comparing in the mobile station the entered SPC to the stored SPC; and (d) only if the entered SPC and the stored SPC are found to be equal, enabling a function to be performed.

The multi-bit secret pattern is preferably an Authentication Key (A-key), and the SPC is preferably a checksum derived from an algorithmic combination of the A-key and an electronic serial number (ESN) of the mobile station. The SPC may also be derived from at least one further mobile station parameter, such as the mobile station identification number (MIN) and/or the International Mobile Station Identity (IMSI).

Also disclosed is a mobile station that is constructed to operate in accordance with the method, as well as a wireless telecommunications system that includes a service provider site that includes a data processor and database for algorithmically combining at least the A-key and an electronic serial number of the mobile station to derive a checksum value and for inputting the derived checksum value into the mobile station. The mobile station in this system includes a memory for storing the inputted checksum value as a SPC, a SPC entry device, such as a keypad, auxiliary data port, or an RF antenna, receiver and demodulator, and a comparator for comparing the entered SPC to the stored SPC. The comparator is responsive to a condition wherein the entered SPC and the stored SPC are found to be equal, for enabling a desired function to be performed.

This invention also teaches a method for operating a wireless mobile station that includes the steps of (a) storing in the mobile station a multi-bit secret pattern for use in a mobile station authentication process (A-key) and also storing a unique identification code (ESN) of the mobile station; (b) sending a message to the mobile station, the message instructing the mobile station to generate the Service Programming Code (SPC); and, in response to receiving the message, (c) generating the SPC within the mobile station by an algorithmic combination of the multi-bit secret pattern and the unique identification code.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
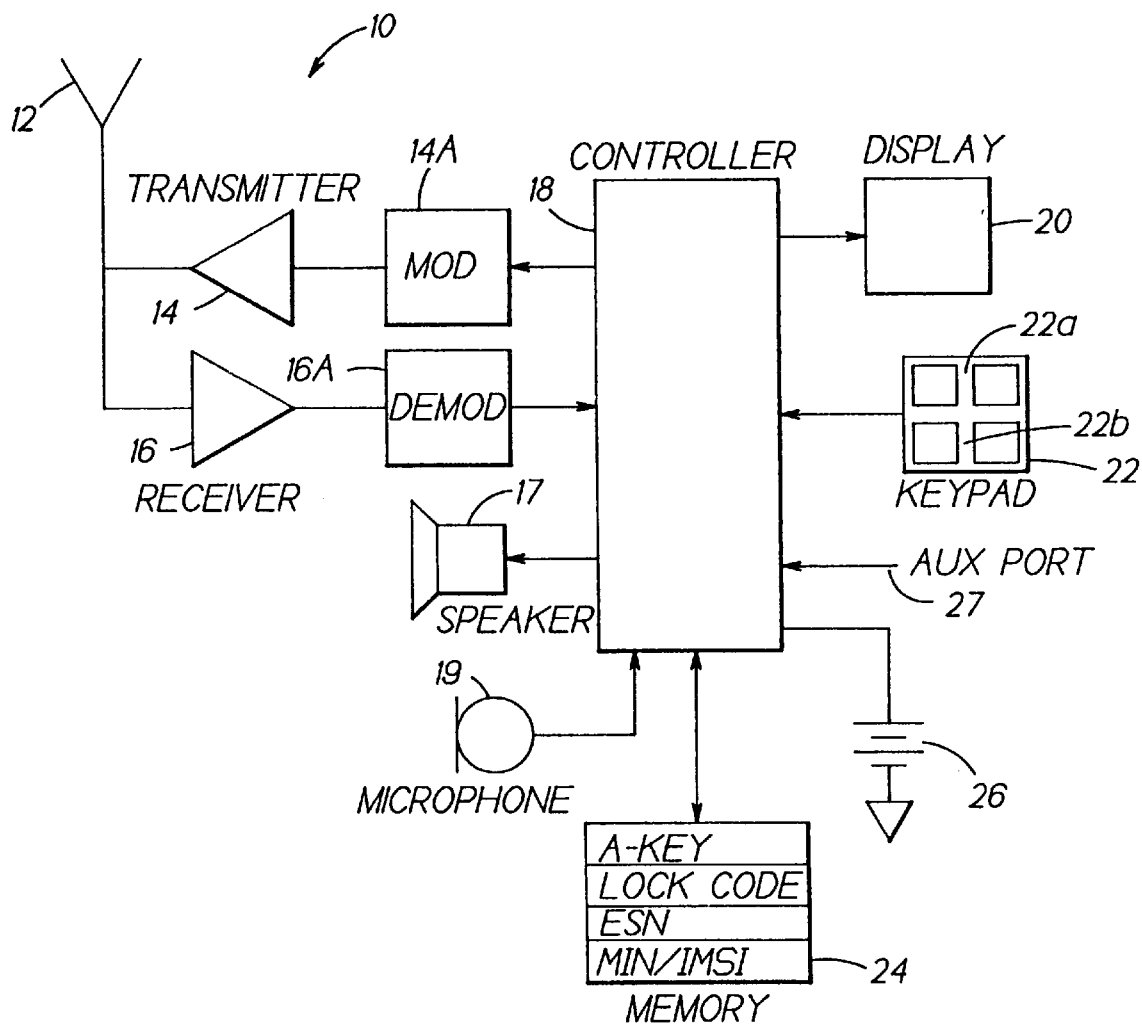
FIG. 1 is a block diagram of a mobile station that is constructed and operated in accordance with this invention.
Figure 2:
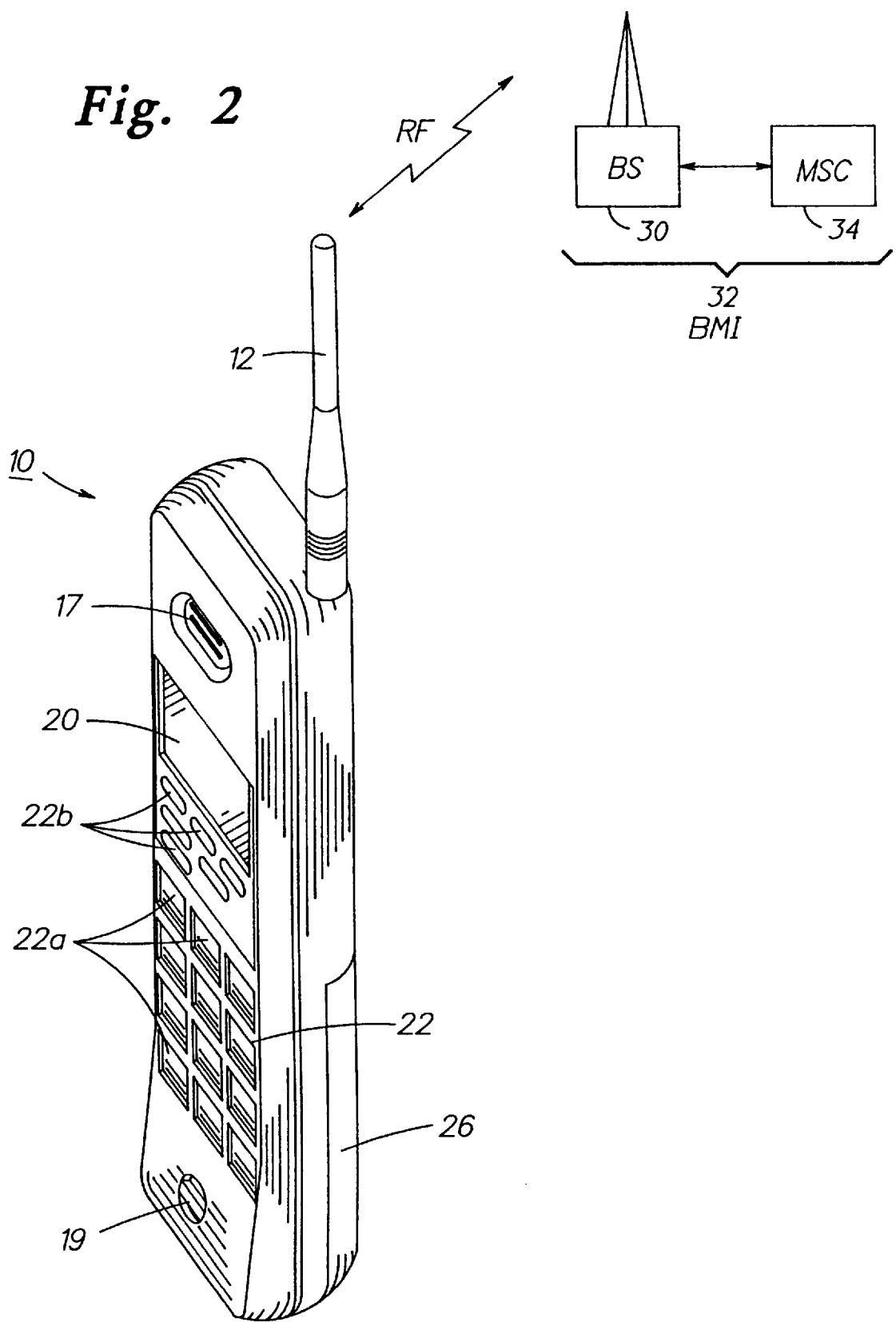
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising a base station/mobile switching center/internetworking function (BMI) 32 that includes a Mobile Switching Center (MSC) 34. The MSC 34 provides a connection to landline trunks when the mobile station 10 is registered with the network.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM) which includes certain parameters that are programmable only when the mobile station is 'program unlocked'. An operating program for controlling the operation of controller 18 is also stored in the memory 24 (typically in a ROM device). The memory 24 may also store data, including user messages, that is received from the BMI 32 prior to the display of the messages to the user. The mobile station 10 also includes a battery 26 for powering the various circuits that are required to operate the mobile station 10.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of air interface standards including EIA/TIA-553 (AMPS), IS-136 (TDMA), and IS-95 (CDMA). Narrow-band AMPS (NAMPS), as well as TACS, mobile stations may also benefit from the teaching of this invention. The teaching of this invention is also applicable to PCS systems. It should thus be clear that the teaching of this invention is not to be construed to be limited to any one particular type of mobile station or air interface standard.

The operating program in the memory 24 may include routines to present messages and message-related functions to the user on the display 20. The memory 24 also includes routines for implementing the method described below in relation to FIG. 3.

In accordance with this invention the memory 24 also stores a SPC or lock code (LC). The stored SPC is derived either directly or indirectly from a parameter known as the "A-key". As is specified in, by example, TIA/EIA/IS-95, section 6.3.12, the Authentication Key or A-key is a 64-bit pattern that is assigned to the mobile station, that is stored in the mobile station's security and identification memory (part of memory 24), and that is known only to the mobile station and the mobile station's associated Home Location Register/Authentication Center (HLR/AC).

More particularly, as currently specified the A-key is 20 digits (64-bits) long. An A-key checksum is 6-digits (18-bits long). The 20 A-key digits are converted into a 64-bit representation which serves as an input to an authentication algorithm, along with the electronic serial number (ESN) of the mobile station 10.

In accordance with this invention, the authentication algorithm is run in the same manner as for a specified Auth_Signature procedure (see, for example, EIA/TIA/IS-95, section 6.3.12). An 18-bit response of the authentication algorithm is the A-key checksum. The A-key checksum is returned as 6 decimal digits for entry into the mobile station 10 for storage in memory 24 as the SPC.

The use of the A-key checksum as the SPC has a number of advantages over other approaches that may be employed for deriving a mobile station SPC.

First, the A-key associated with each ESN is known only to the service provider or carrier, and is not shared among carriers. As such, the A-key can be considered to be secret. As the generation of the A-key checksum uses the A-key and the ESN, the resulting SPC is known only to the one carrier who authorizes service for the mobile station 10. Furthermore, the A-key checksum is never transmitted between the mobile station and the BMI 32 in unencrypted form, and is thus not susceptible to being intercepted by third parties. In general, the checksum operation is a complex, non-reversible process. When the A-key checksum is used as the SPC, in accordance with the teachings of this invention, the A-key checksum is encrypted prior to transmission.

Second, the checksum or SPC is unique to each mobile station 10, as it is calculated based on the mobile station's unique ESN.

Third, the mobile station 10 is already required to calculate the authentication checksum as part of the authentication procedure and, as a result, the use of the checksum for the SPC does not require the mobile station to implement new or different algorithms or procedures.

Fourth, the A-key and associated checksum/SPC that are stored in the mobile station 10 are not accessible for reading or writing by unauthorized users. In this invention the SPC can be entered by the keypad 22, or through an auxiliary data port 27, or over the RF channel, and verification is performed inside the mobile station 10. Activation of a desired function is inhibited if an incorrect SPC is entered.

Fifth, the use of the A-key checksum for the SPC clearly reduces the data base management requirements of the service provider.

Figure 3:
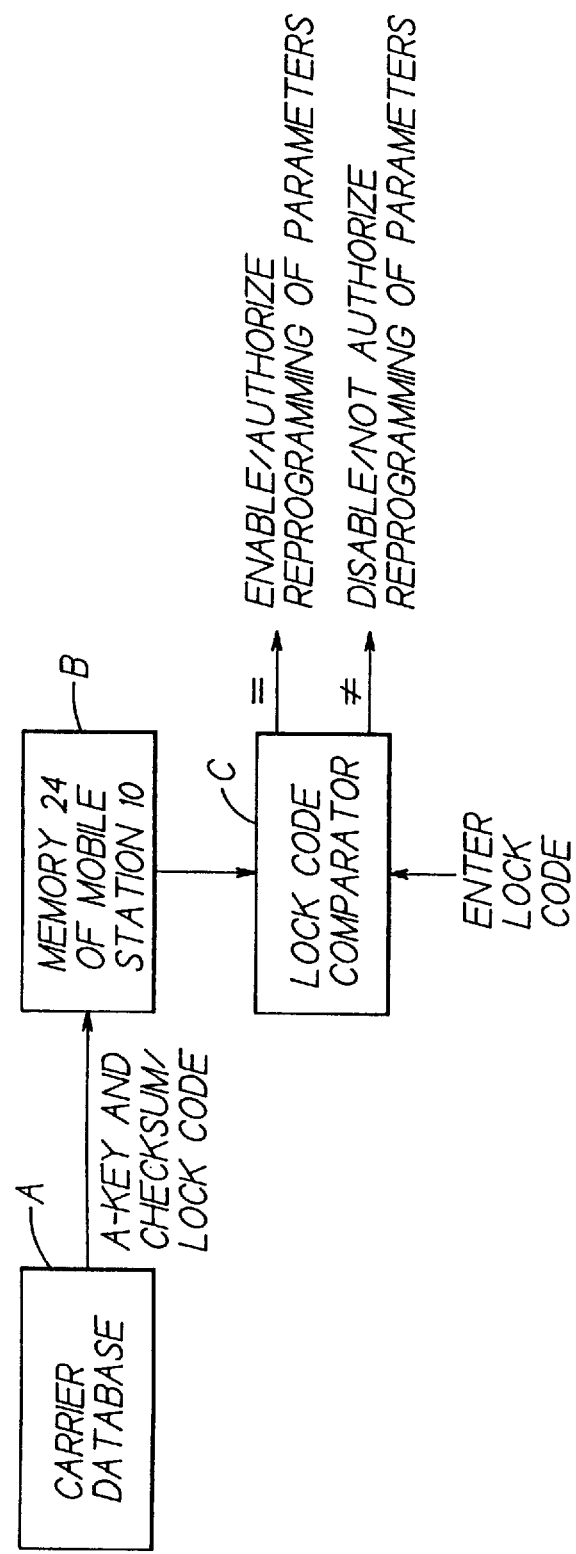
FIG. 3 is logic flow diagram of a method in accordance with this invention.

Reference is now made to FIG. 3 for illustrating a logic flow diagram in accordance with a method of this invention. At Block A a carrier database is accessed, the authentication algorithm is executed on at least the A-key and ESN of the mobile station 10, and an initial purchaser's mobile station is programmed with A-key, checksum, and thus SPC information. This information is stored in the memory 24 of the mobile station 10 (Block B). Subsequently a SPC is entered by the user through the keypad 22, or by the same or different carrier through the auxiliary data port 27, or over the air from the BMI 32. The entered SPC is input to a mobile station comparator function (the comparator function may be implemented by the controller 18 of FIG. 1) and a comparison is made (Block C) to determine if the entered SPC matches the stored SPC. If they are found to be equal, the mobile station is unlocked and enables or authorizes the activation of some desired function, such as the reprogramming of certain mobile station parameters (e.g., one or more NAM parameters) or the providing of service to the mobile station 10. If the entered SPC does not match the stored SPC, the mobile station is not unlocked and thus does not enable or authorize activation of the desired function.

In accordance with a further aspect of this invention, the SPC is generated internally to the mobile station 10. This is preferably accomplished by enabling the BMI 32 to ascertain whether the mobile station is capable of generating the SPC internally. Furthermore, since the internally generated SPC is based at least in part on the A-key value, a change in the A-Key value enables the mobile station 10 to locally and automatically re-generate the SPC, provided the mobile station supports the internal SPC generation mode of operation. If the network does not support authentication of mobile stations, and hence the A-key may not be required, any random A-key value can be generated and used to generate the SPC.

The ensuing description is presented in the context of the EIA/TIA/IS-95 standard, although it will be realized by those skilled in the art that the teaching of this invention is applicable to a variety of air interface standards and to mobile stations and networks constructed and operated in accordance with these air interface standards.

First, the Programming Lock Download Message, in particular the Programming Lock Parameter Block Types is modified to include, in addition to the Verify SPC and Change SPC parameter block values in the BLOCK_ID field, a value for specifying that an Internal SPC (A-key checksum) operation is to be performed by the mobile station 10. Using this parameter block type, the base station 30 is enabled to verify that the mobile station 10 supports the internally generated SPC operation.

Second, a PARAM_DATA field of the Internal SPC Parameter block is defined to include a sub-field (two bits) designated as SPC_VALUE. The base station 30 sets this sub-field to '00' to indicate that the mobile station 10 is to use the internally generated SPC. If set to '01', the mobile station is intended instead to use the default SPC value.

Figure 4:
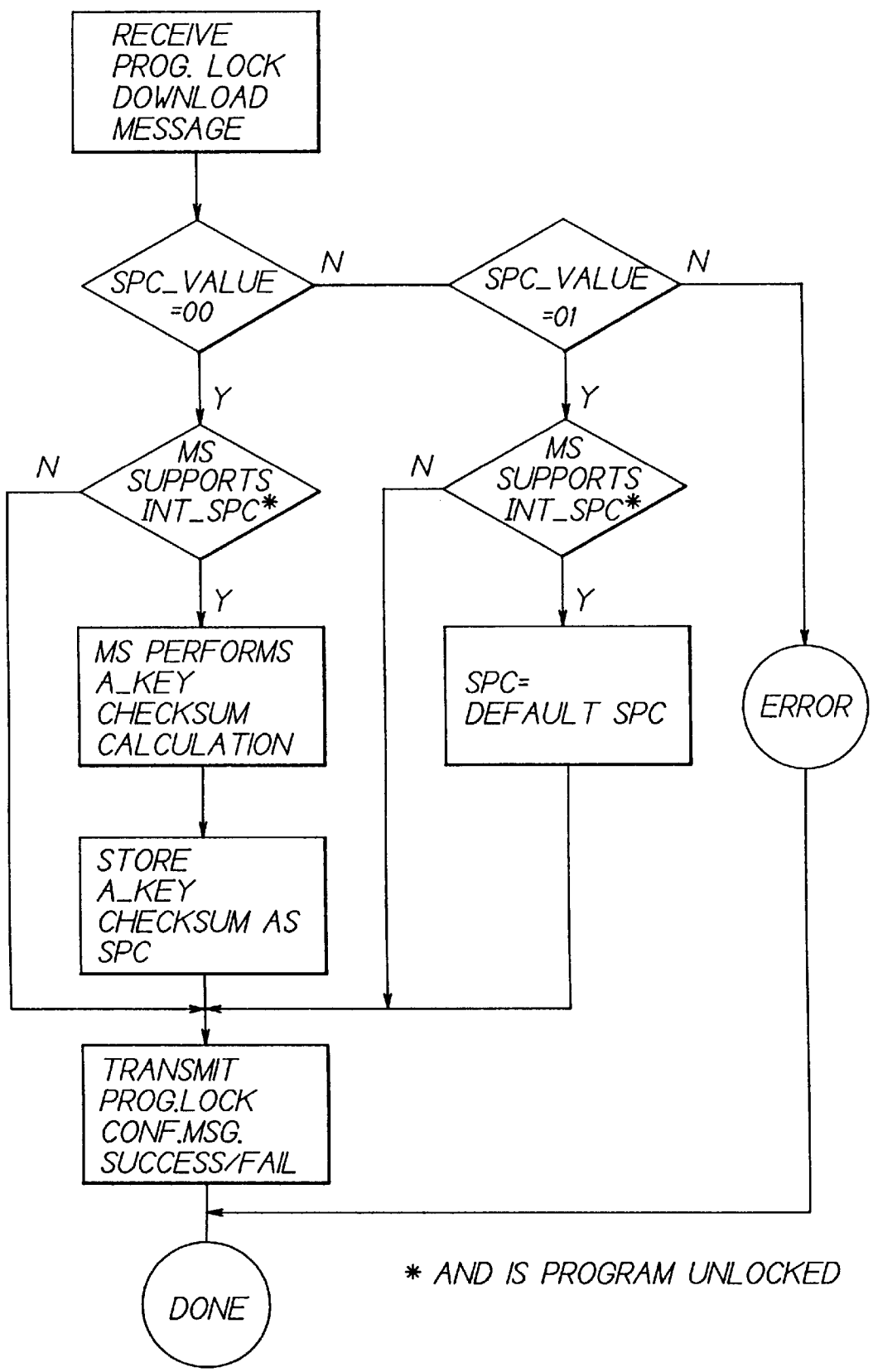
FIG. 4 is a logic flow diagram in accordance with a further method of this invention.

Referring now to FIG. 4, the operation of the mobile station 10 is as follows. Upon receipt of the Programming Lock Download Message, with the Internal SPC (A-key checksum) Parameter Block Type, the mobile station examines the SPC VALUE sub-field. If the SPC VALUE sub-field is '00', and if the mobile station 10 is program unlocked (see Section 3.3.2), or if the mobile station SPC value is set to default, the mobile station generates the SPC value as follows.

First, the mobile station 10 executes the A-key checksum calculation procedure, as defined by the "Common Cryptographic Algorithm", (Section 2.1.1) to generate the six digit A-key checksum.

Second, the mobile station 10 then stores and uses the six digit checksum value as the SPC. It should be noted that whenever the mobile station A-key value is changed, the new SPC value is generated.

Third, the mobile station 10 transmits a Programming Lock Download Confirmation Message within a predetermined time (e.g., 750 milliseconds) with an appropriate result code. If the mobile station 10 successfully generates the SPC value, the result code is set accordingly to a first value (success). If the mobile station 10 does not support the internal generation of the SPC, the result code is set to a second value (failure) for indicating that the Programming Lock Download Message was rejected because the BLOCK_ID value (i.e., Internal SPC (A-key checksum) operation) is not supported.

If the mobile station determines that the SPC_VALUE sub-field is '01', and if the mobile station 10 is program unlocked, the mobile station sets the SPC to its default value (i.e., the value originally programmed into the mobile station by the service provider).

If the mobile station is program unlocked, the mobile station 10 transmits the Programming Lock Download Confirmation Message within the predetermined time with an appropriate result code to indicate that the command was accepted, and was executed successfully. If the mobile station is not program unlocked, the result code is set to a second value for indicating that the Programming Lock Download Message was not expected in this mode of operation. If the mobile station 10 does not support the internal generation of SPC, then the result code is set as before for indicating that the Programming Lock Download Message was rejected because the BLOCK_ID value (i.e., Internal SPC (A-key checksum) operation) is not supported.

If the mobile station 10 does support the internal generation of SPC, and if the SPC value was generated internally, and if the mobile station 10 receives the Change SPC parameter block in the Programming Lock Download Message, then the result code is also set for indicating that the Programming Lock Download Message was rejected because the BLOCK_ID value (i.e., Change SPC) is not supported.

Although described in the context of presently preferred embodiments, it should be realized that a number of modifications to these teachings may occur to one skilled in the art. By example, it is also within the scope of this invention to employ one or more other stored parameters in determining the value of the SPC, such as a mobile station identification value. For example, the Mobile Station Identification Number (MIN) could also be employed, in combination with the ESN and A-key, through the use of some suitable algorithm. Alternatively, the International Mobile Station Identity (IMSI) value can be used with the ESN and the A-key.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless mobile station, comprising the steps of:

storing in the mobile station a Service Programming Code (SPC) derived at least in part from a multi-bit secret pattern that is stored in the mobile station for use in a mobile station authentication process, the SPC operating as a locking code for enabling at least one mobile station function to be performed;

entering a SPC into the mobile station;

comparing in the mobile station the entered SPC to the stored SPC; and only if the entered SPC and the stored SPC are found to be equal, enabling the at least one mobile station function to be performed.

2. A method as set forth in claim 1, wherein the multi-bit secret pattern is an A-key.

3. A method as set forth in claim 1, wherein the SPC is a checksum derived from an algorithmic combination of an A-key and an electronic serial number of the mobile station.

4. A method as set forth in claim 1, wherein the SPC is derived from an algorithmic combination of an A-key and an electronic serial number of the mobile station, and at least one further mobile station parameter.

5. A method as set forth in claim 1, wherein the SPC is derived from an algorithmic combination of an A-key and an electronic serial number of the mobile station, and a mobile station identification value.

6. A mobile station, comprising:

a memory for storing a Service Programming Code (SPC) derived at least in part from a multi-bit secret pattern that is stored in the mobile station for use in a mobile station authentication process, the SPC operating as a locking code for enabling at least one mobile station function to be performed;

means for entering a SPC into the mobile station; and means, coupled to the memory and to the entering means, for comparing the entered SPC to the stored SPC, said comparing means being responsive to a condition wherein the entered SPC and the stored SPC are found to be equal, for enabling the at least one mobile station function to be performed.

7. A mobile station as set forth in claim 6, wherein the multi-bit secret pattern is an A-key.

8. A mobile station as set forth in claim 6, wherein the SPC is a checksum derived from an algorithmic combination of an A-key and an electronic serial number of the mobile station.

9. A mobile station as set forth in claim 6, wherein the SPC is derived from an algorithmic combination of an A-key and an electronic serial number of the mobile station, and at least one further mobile station parameter.

10. A mobile station as set forth in claim 6, wherein the SPC is derived from an algorithmic combination of an A-key and an electronic serial number of the mobile station, and a mobile station identification value.

11. A wireless telecommunications system comprising a service provider site and at least one mobile station, comprising:

at said service provider site, means for algorithmically combining at least an A-key and an electronic serial number of a mobile station to derive a value, and further comprising means for inputting said value into said mobile station; and said mobile station comprising a memory for storing said inputted value as a Service Programming Code (SPC), the SPC operating as a locking code for enabling at least one mobile station function to be performed; means for entering the SPC into the mobile station; and means, coupled to the memory and to the entering means, for comparing the entered SPC to the stored SPC, said comparing means being responsive to a condition wherein the entered SPC and the stored SPC are found to be equal, for enabling the at least one mobile station function to be performed.

12. A system as set forth in claim 11, wherein the SPC is derived from an algorithmic combination of said A-key and said electronic serial number of the mobile station, and is further derived from a mobile station identification value.

13. A method for operating a wireless mobile station, comprising the steps of:

storing in the mobile station a multi-bit secret pattern for use in a mobile station authentication process and also storing at least one unique identification code of the mobile station;

sending a message to the mobile station, the message instructing the mobile station to generate a Service Programming Code (SPC), the SPC operating as a locking code for enabling at least one mobile station function to be performed; and in response to receiving the message, generating the SPC within the mobile station by an algorithmic combination of the multi-bit secret pattern and the at least one unique identification code.

14. A method as set forth in claim 13, wherein the multi-bit secret pattern is an A-key, and wherein the unique identification code is an electronic serial number (ESN).

15. A method as set forth in claim 14, wherein the SPC is a checksum derived from an algorithmic combination of at least the A-key and the ESN.

16. A method as set forth in claim 14, wherein the SPC is derived from an algorithmic combination of an A-key and the ESN, and at least one further mobile station parameter.

17. A method as set forth in claim 16, wherein the at least one further mobile station parameter is one of a mobile station identification number (MIN) and an international mobile station identity (IMSI).

18. A method for operating a wireless mobile station, comprising the steps of:

storing in the mobile station a multi-bit secret pattern for use in a mobile station authentication process and also storing at least one unique identification code of the mobile station;

sending a message to the mobile station, the message instructing the mobile station to generate a Service Programming Code (SPC); and in response to receiving the message, generating the SPC within the mobile station by an algorithmic combination of the multi-bit secret pattern and the at least one unique identification code, wherein for a case that the mobile station is not capable of internally generating the SPC, the step of generating is replaced by a step of transmitting a message from the mobile station for indicating that the mobile station is not capable of internally generating the SPC.

19. A method for operating a wireless mobile station, comprising the steps of:

storing in the mobile station a multi-bit secret pattern for use in a mobile station authentication process and also storing at least one unique identification code of the mobile station;

sending a message to the mobile station, the message instructing the mobile station to generate a Service Programming Code (SPC); and in response to receiving the message, generating the SPC within the mobile station by an algorithmic combination of the multi-bit secret pattern and the at least one unique identification code, and further comprising a step of, sending a second message to the mobile station, the second message instructing the mobile station to use a default value of the SPC;

in response to receiving the message, setting the SPC within the mobile station to the default value; and transmitting a message from the mobile station for indicating that the mobile station has set the SPC to the default value.

20. A method as set forth in claim 19, wherein for a case that the mobile station is not capable of internally generating the SPC, the step of generating is replaced by a step of transmitting a message from the mobile station for indicating that the mobile station is not capable of internally generating the SPC, and in response to receiving the second message, the step of setting is not performed and the step of transmitting also transmits a message from the mobile station for indicating that the mobile station is not capable of internally generating the SPC.

* * * * *